Aug. 15, 1967

J. R. GROSHOLZ ET AL 3,335,713

INFANT INCUBATOR

Filed Nov. 5, 1963

INVENTORS
JAMES R. GROSHOLZ
AND JOHN D. WALLACE
BY

*Synnestvedt + Lechner*

ATTORNEYS

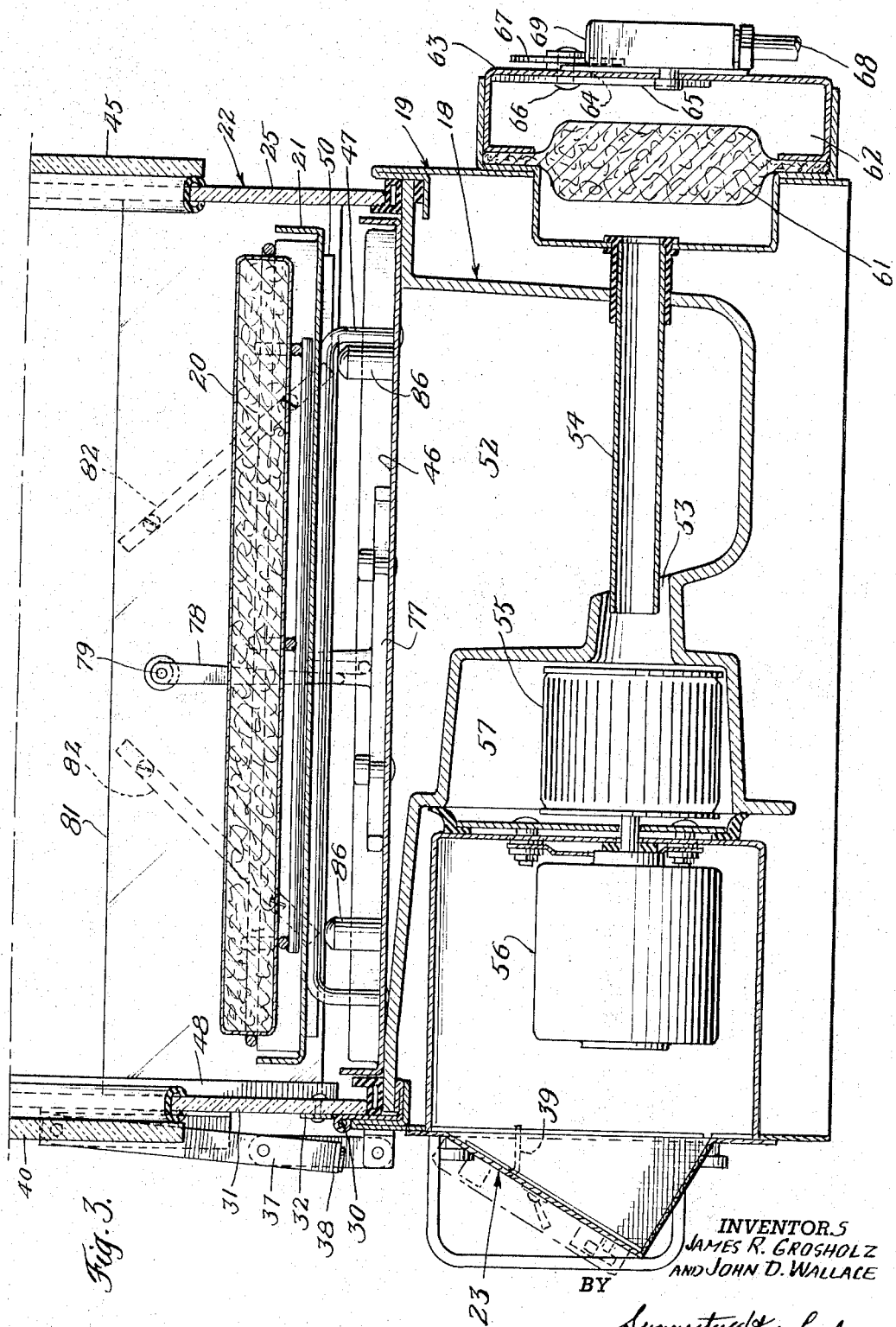

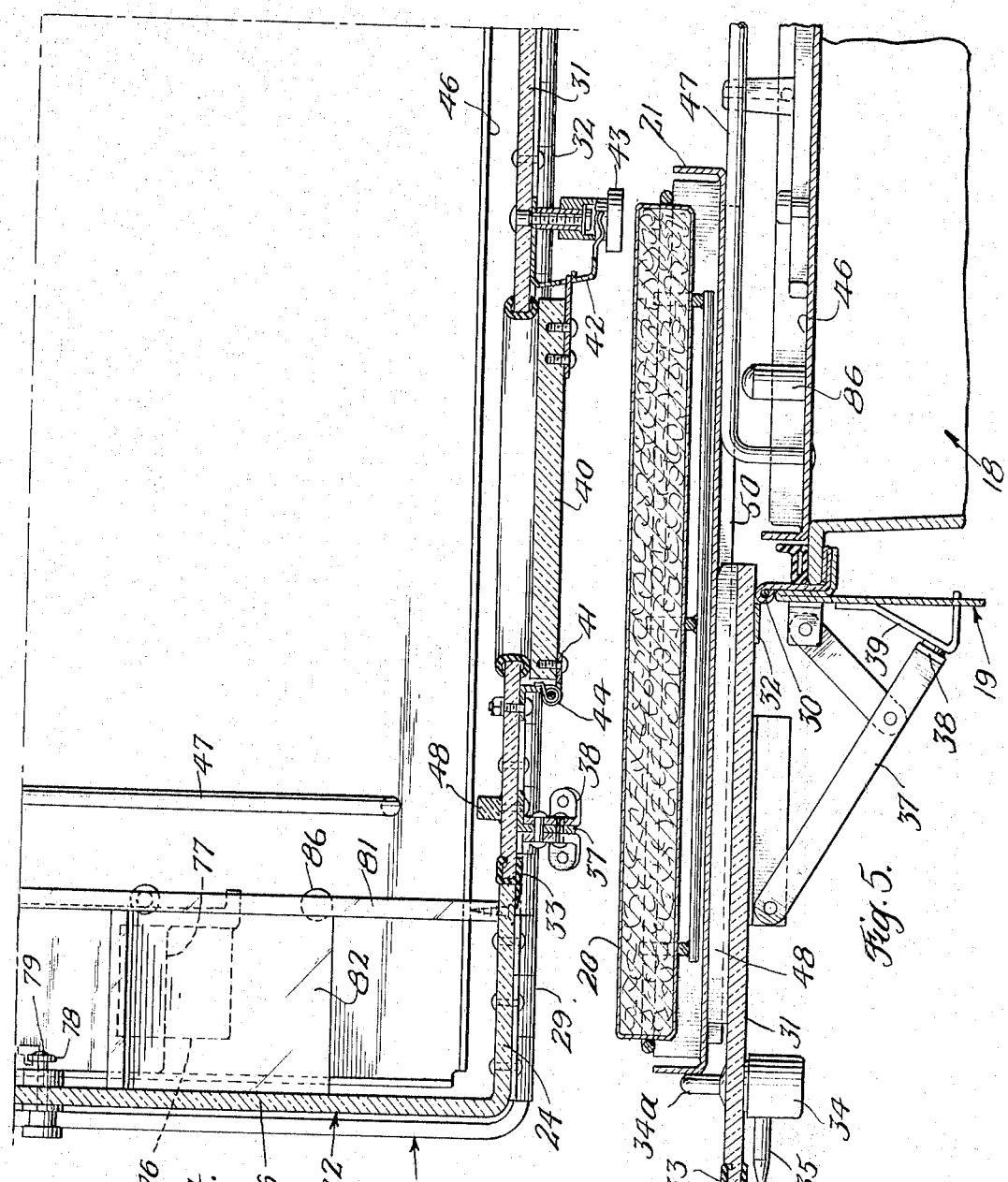

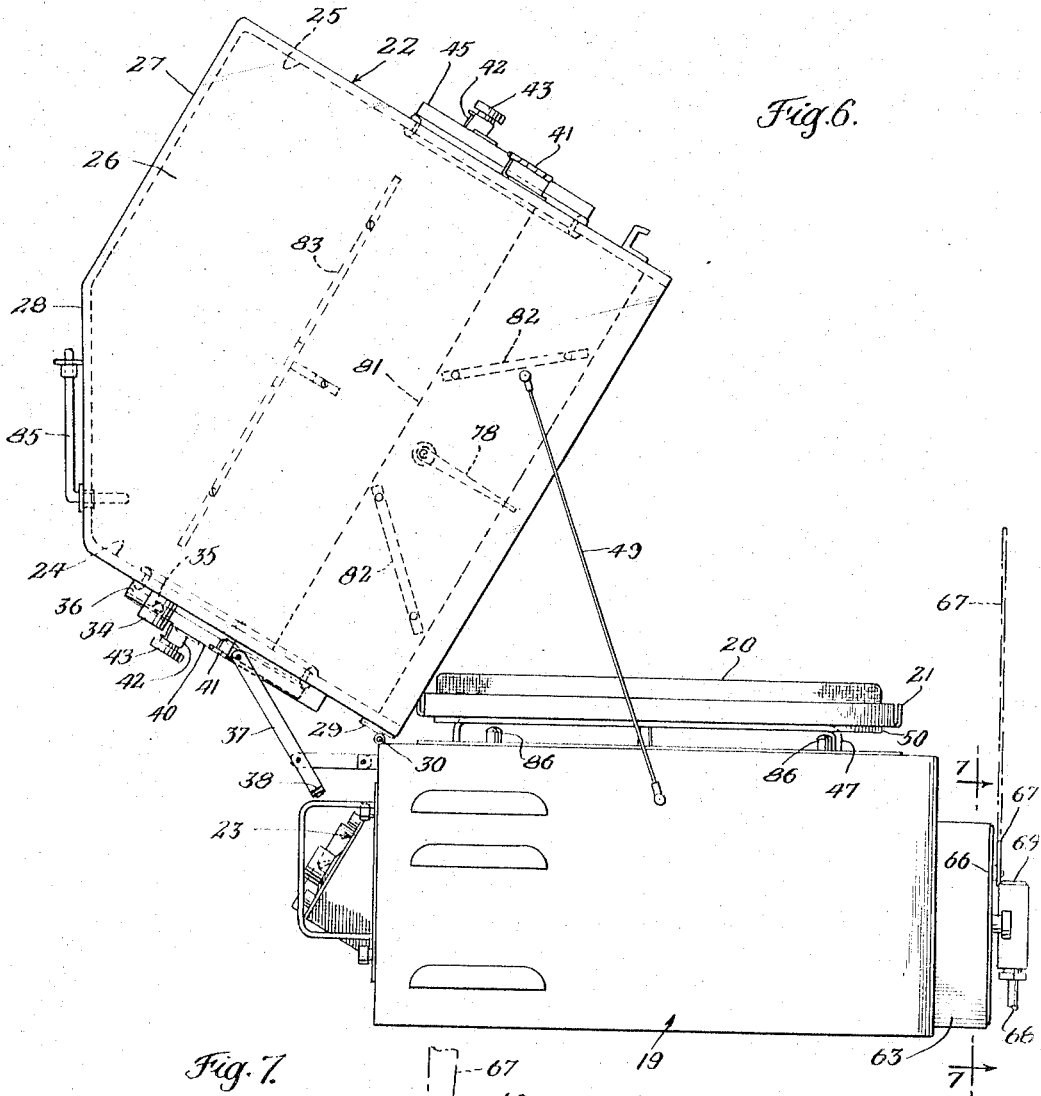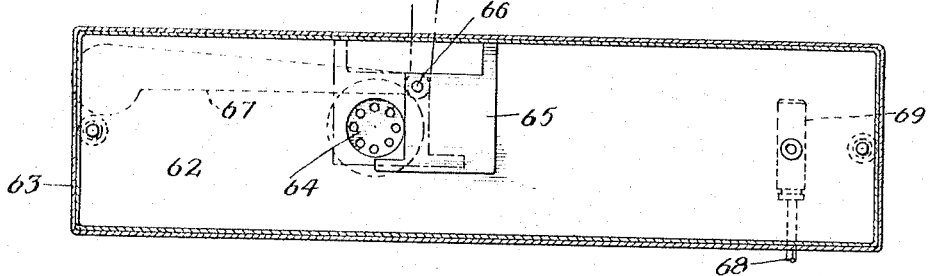

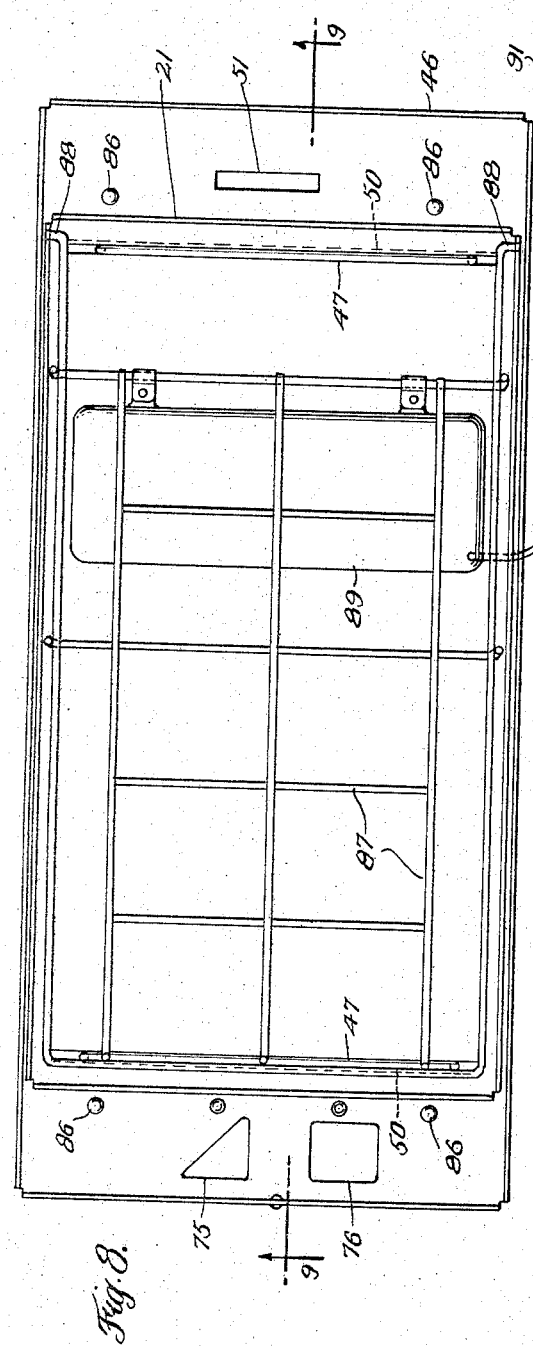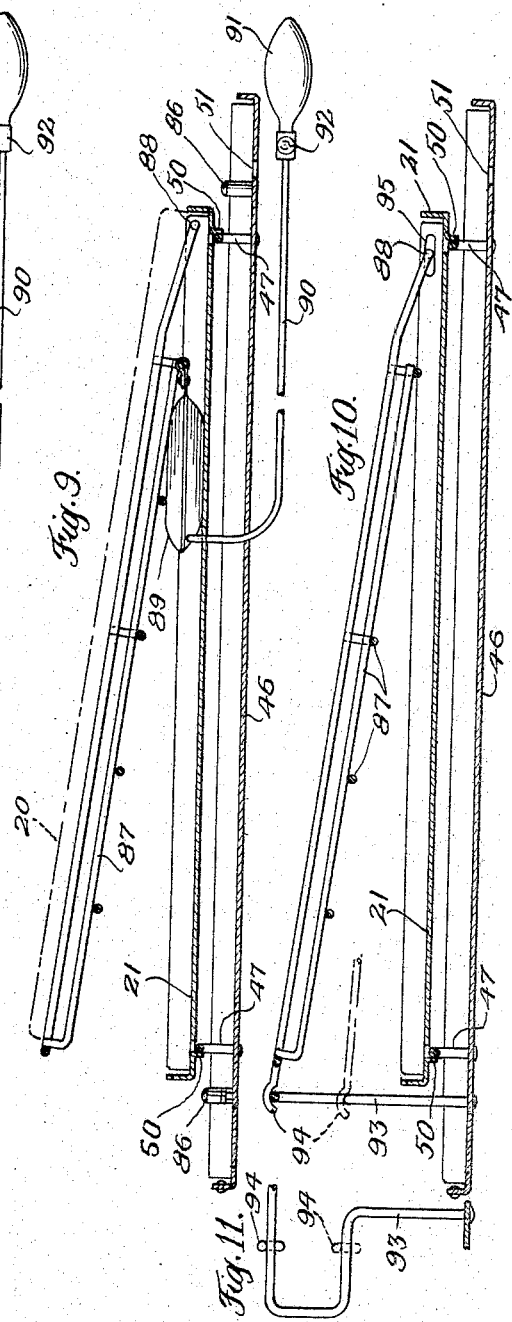

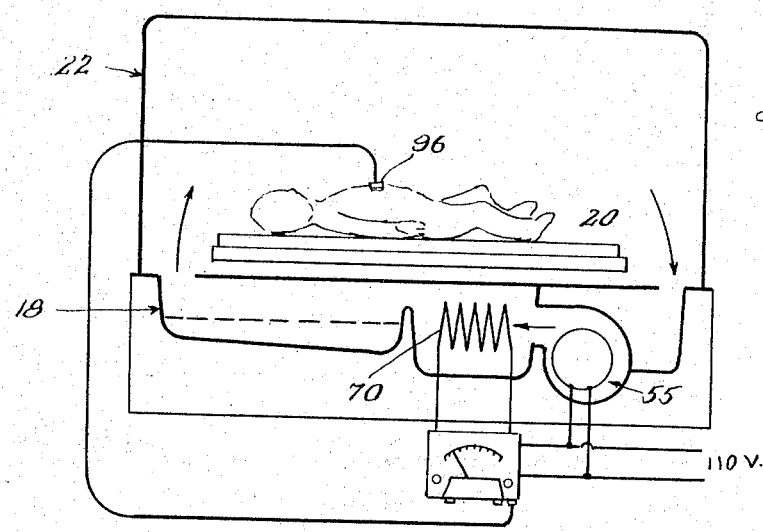
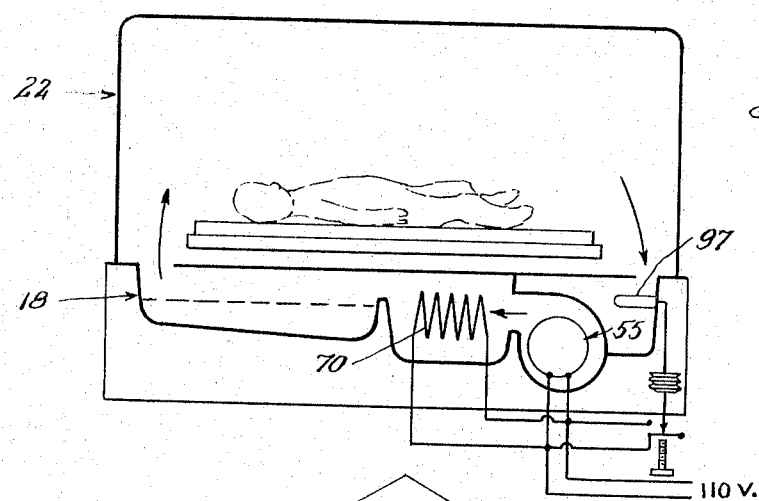
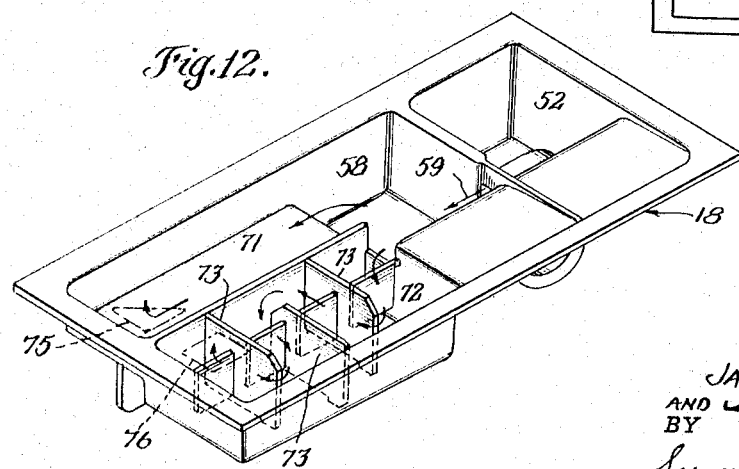

Aug. 15, 1967 J. R. GROSHOLZ ET AL 3,335,713
INFANT INCUBATOR
Filed Nov. 5, 1963
8 Sheets-Sheet 8

INVENTORS
JAMES R. GROSHOLZ
AND JOHN D. WALLACE
BY
Synnestvedt & Lechner
ATTORNEYS

United States Patent Office 3,335,713
Patented Aug. 15, 1967

3,335,713
INFANT INCUBATOR
James R. Grosholz, Strafford, and John D. Wallace, Wyndmoor, Pa., assignors to Air-Shields, Inc., Hatboro, Pa., a corporation of Delaware
Filed Nov. 5, 1963, Ser. No. 321,491
16 Claims. (Cl. 128—1)

This invention relates to incubators and is particularly useful in connection with incubators for infants, being especially well adapted to employment with infants born prematurely.

In general the objects and advantages of the invention are related to increase in the reliability, effectiveness, safety and convenience of incubators.

Among the more or less specific objects of the invention are the following:

In accordance with one aspect of the invention, a door is provided along one of the longer sides of the incubator and provision is made for convenient displacement of the mattress or other infant support laterally out of and back into the enclosed space of the incubator through the door. At the same time armholes or similar access ports are also provided, to enable attendants to give attention to the infant within the incubator, without withdrawing the infant support.

The arrangement of the invention also contemplates the positioning of an inclined transparent wall panel extended inwardly and above the infant support from a side wall of the incubator in which access portage is provided, this arrangement being of advantage in providing clarity of observation by the attendant when giving attention to the infant within the incubator.

In accordance with still another aspect of the invention, provision is made for inclining the infant support within the incubator, the arrangement provided for this purpose enabling the operator or attendant to effect such inclination of the infant support without opening the incubator, and even without the insertion of a hand through one of the access ports.

A further object of the invention is concerned with maintaining maximum purity of the air circulated in the incubator, and with this object in view, the invention provides filtering means for air introduced into the circulation system, provision also being made for introduction of oxygen into the circulation system in a manner to pass through the filter so that not only the replacement air but also the oxygen, when used, is subject to the filtering action. In this way bacteriological impurities originating even in the oxygen supply are substantially eliminated.

In considering still another aspect of the invention it is noted that an air heater is customarily included in incubators, in order to warm the recirculated and replacement air. An important object of the present invention is to provide a heater system and an air flow system so proportioned as to maintain a temperature at the surface of the heater or heater element at a relatively low value, desirably not in excess of about 300° F. The importance of this lies in the fact that in occasional uses of incubators, infants who have been subjected to ether anesthesia are placed in the incubators, and when ether is brought in contact with relatively high temperature elements, a reaction occurs resulting in the production of some formaldehyde by decomposition of the ether. Formaldehyde is an irritant to the respiratory system. Maintenance of a heater surface temperature below 300° F. prevents such decomposition of ether.

Still other objects of the invention have reference to improvement in the humidification and temperature control of the air circulated through the incubator.

In addition to the foregoing, the invention accomplishes the various purposes enumerated while at the same time maintaining a high degree of ease and reliability in sterilization of the equipment, the various devices, chambers, and air passages all being worked out to avoid cracks and corners and the like such as would have a tendency to accumulate impurities and thereby render the cleaning and sterilization of the equipment difficult.

How the foregoing objects and advantages are attained will be clear from the following description referring to the accompanying drawings illustrating a preferred embodiment of the invention and in which:

FIGURE 3 is an enlarged and broken vertical section taken substantially as indicated by the line 3—3 on FIGURE 1;

FIGURE 4 is a partial plan section on the scale of FIGURE 3, taken as indicated by the line 4—4 on FIGURE 1;

FIGURE 5 is a partial vertical section on the scale of FIGURES 3 and 4, taken as indicated by the line 5—5 on FIGURE 1 and illustrating particularly the access door in open position, with the infant support partially withdrawn from the incubator;

FIGURE 6 is an end elevational view of the incubator taken from the right of FIGURE 1 and illustrating the hood in open position;

FIGURE 7 is a vertical sectional view of the air and oxygen inlet chamber taken as indicated by the line 7—7 on FIGURE 6;

FIGURE 8 is a plan view of a mattress support and of the deck lying beneath the mattress support, this view also showing a device for varying the inclination of the mattress;

FIGURE 9 is a vertical sectional view of various parts included in the mounting of the mattress support, the view being taken as indicated by the line 9—9 on FIGURE 8;

FIGURE 10 is a view similar to FIGURE 9 but illustrating an alternative arrangement for varying the inclination of the mattress support;

FIGURE 11 is a view of certain details of the arrangement of FIGURE 10;

FIGURE 12 is an isometric view of the upper side of the main base structure of the incubator;

FIGURE 13 is a diagrammatic view illustrating use of the incubator of the invention in a manner under the control of the temperature of an infant in the incubator;

FIGURE 14 is a view similar to FIGURE 13 but illustrating alternative use of the incubator having temperature control independently of the body temperature of the infant;

FIGURE 17 is still another graph illustrating heat flux and air capacity preferably employed in maintaining the surface temperature of the heater below 300°, for the purposes above referred to.

Generally considered, the construction of the incubator includes as principle parts, a base or base member having air chambers therein for various purposes and on which various working parts are mounted. The base is enclosed in a case adapted to rest upon any suitable support, most frequently a rolling cart for ease of movement of the incubator from place to place. Above the base is a support for the infant including a mattress support and mattress. A hood surmounts the base and provides an enclosure for the infant. Preferably the hood is made of transparent material such as polymethyl methacrylate, for instance the resin materials of this kind known in the trade under the trademarks "Plexiglas" and "Lucite."

In various of the figures the base is designated in general by the numeral 18, and the overall arrangement of this base appears in FIGURE 12 which illustrates the base by itself in isometric projection. The box or enclosure for the base is made up of sheet metal parts and is indicated in general in various of the figures by the numeral 19. The mattress for the infant is indicated at 20, the mattress being carried by a support or tray 21 mounted above the base.

Figure 1:
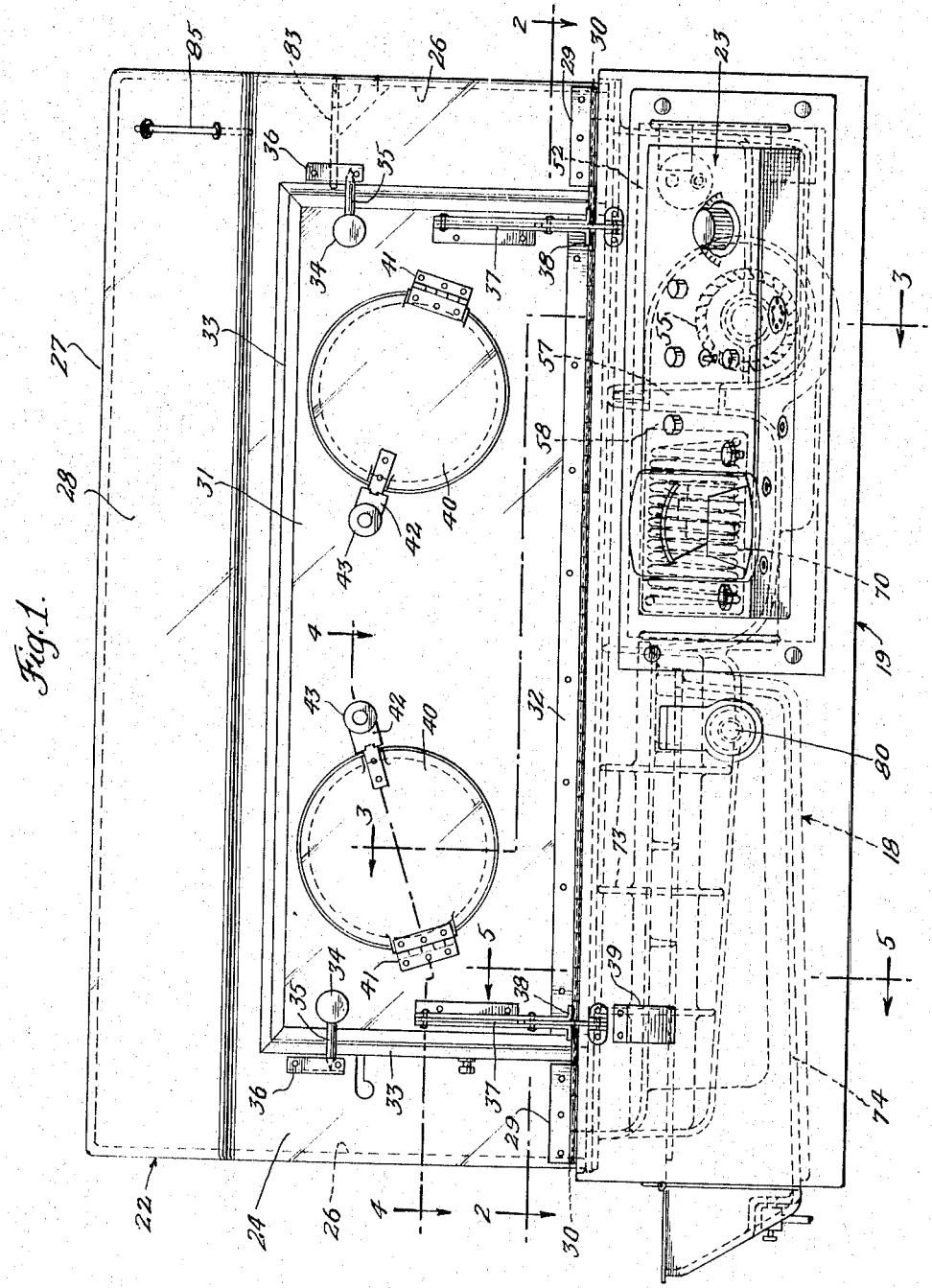
FIGURE 1 is a front elevational view of an incubator incorporating the various features of the invention as above set out.

The hood, made up of transparent plastic walls, is generally indicated at 22, the overall arrangement of the hood being best shown in FIGURES 1 and 6.

The construction of the hood is first described, as follows:

Although both sides of the incubator are intended to be accessible for various purposes, the side on which the control panel generally indicated at 23 is located will, for convenience of description herein, be considered as the front of the incubator.

The hood is in general of box-like construction having side or generally upright walls including front and back walls 24 and 25, and end walls 26. The hood also has a top wall 27. In addition there is an obliquely inclined wall panel 28 extended from the upper edge of the front wall 24 inwardly and over the mattress 20 and joining the forward edge of the top 27 of the hood. In connection with the inclined wall it is noted that access portage (described more fully herebelow) is provided in the front wall 24 of the incubator hood, and the positioning of this portage and of the inclined wall panel 28 is such that when an attendant is giving attention to the infant by insertion of the arms or hands through the portage in the front wall, the inclined panel affords to the attendant a clear and direct line of observation of the infant, without having a joint or corner of the hood intervening in the line of vision. This inclined panel arrangement is also of advantage because the line of vision from the attendant to the infant within the incubator extends substantially perpendicularly through the inclined wall panel, rather than at a substantial oblique angle which latter would have a tendency to distort or impair the vision.

Before considering the arrangement of the portage in the front wall of the hood attention is called to the fact that the hood as a whole is pivotally connected to a fitting at the upper edge of the base 18 by means of hinge parts 29 and a long hinge pin 30 (see especially FIGURES 1, 3 and 6) which extends all the way across the side of the incubator. This long hinge pin serves not only as the hinge pin for connecting the hood to the base but also as the hinge pin for mounting the access door 31. Hinge parts 32 are also provided to complete the hinge for the door. In effect the hinge parts 29, 30 and 32 constitute a long piano type hinge with portions of one of the butts cut out between the parts 29 and 32. In this way a sturdy and simple construction is provided in which the hinge axes for both the hood and the door are coincident. The door is provided with a rubber sealing gasket indicated at 33 and carries knobs 34 with projecting fingers 35 adapted to engage under latch or fastening devices 36 provided on the hood adjacent to the door opening.

As will be seen from FIGURES 1, 3, 5 and 6, the door is adapted to be supported substantially horizontally when in its open position, by means of jointed linkages 37, one such linkage being provided toward each end of the door and each having a foot 38. The foot of the left hand linkage is adapted to engage a bracket 39 mounted on the base enclosure and having the same inclination (see FIGURES 3 and 5) as the control panel 23 on which the foot 38 of the right hand linkage rests. This gives the door a firm support in the horizontal position, which is here desired because of the use of the door to support the mattress with the infant thereon under certain conditions of the use of the incubator, as will further appear.

The door is also provided with armholes or apertures provided with round "pop-open" doors 40. These doors are each provided with a hinge mounting at 41 of which the hinge axis is positioned so that a perpendicular therefrom to the center of gravity of the door extends upwardly. Stated in another way, the hinges 41 are disposed somewhat downwardly from the center of the door and are inclined so that, after initial opening movement of the door, gravity acts to swing the door to its full open position. Latches indicated at 42 are provided for the doors as seen in FIGURES 1 and 4, these latches being operated by push buttons 43 arranged so they may be actuated by the elbow if desired. A spring 44 is desirably associated with the hinge 41 in order to initiate the opening movement of the door upon actuation of the knob 43, whereupon gravity takes over and swings the door to its full open position.

Additional pop-open doors 45 (see FIGURES 3 and 6) are desirably provided in the rear wall 25 of the hood, so that an attendant may have access to the infant within the incubator from either side of the incubator. This arrangement also makes possible the concurrent access to the infant by two attendants.

The mattress supporting tray 21, as already noted above, is mounted above the base 18 of the incubator. For purposes of support of the mattress and also for certain other purposes relating to the air passages in the base, a deck 46 spans the length and width of the base 18, resting upon the upper edge of the base around the periphery thereof. This deck is provided with tracks or supports 47 on which the mattress supporting tray 21 rests when the mattress support is positioned within the incubator (see particularly FIGURES 3 and 6). The hinged door 31 is also provided with supports or tracks 48 on the inside surface of the door and positioned so that when the door is open the upper surface of the tracks 48 lie in the same plane as the tracks 47. This provides for shifting movement or "roll out" of the mattress from a position within the incubator, as illustrated in FIGURE 3 to a position at least partly outside of the incubator, as indicated in FIGURE 5. In this way complete access to the infant is made possible while the infant is temporarily supported partly outside of the incubator. This arrangement may also be employed for the purpose of inserting the infant and withdrawing the infant from the incubator, which may also be done if desired by opening the hood, for instance to the position indicated in FIG- URE 6 in which the hood is supported by the tension members 49.

The outward motion of the mattress on the tracks 47 and 48 is limited by stops 34a which may conveniently be formed as parts of knobs 34 (see FIGURE 5). In order to retain the mattress support in proper relation to the tracks 47 and 48, the underside of the tray 21 may be provided with spaced guide elements 50 adapted to project downwardly adjacent the tracks 47 and 48 and thus prevent shifting movement of the mattress lengthwise thereof or cooking of the mattress to some angle which might interfere with the shifting motion thereof.

Before considering the air circulation system and the air chambers of the base in detail, it is here first noted that in a preferred embodiment such as herein illustrated and described, it is contemplated that something of the order of 85% to 90% of the air within the hood shall be recirculated, make-up air or oxygen representing about 10% or 15% of the total air flowing through the circulating fan and air conditioning chambers. In connection with the foregoing, it is pointed out that the difference between the gases introduced into the hood and the gases returned to the circulation system represents the normal leakages out of the hood.

The air which passes from the hood back into the air circulation system for recirculation flows downwardly through the opening 51 provided in the deck 46 (see FIGURES 2 and 8), and below the deck 46 this air enters what might be termed a mixing chamber 52 in the base 18 (see FIGURES 3 and 12). Air from the chamber 52 flows through the annular passage 53 around the tube 54 into the radial or squirrel cage fan 55 which is driven by the motor 56. The fan 55 is located in a chamber 57, the exit from which enters another chamber 58 as indicated by the arrow 59 in FIGURES 2 and 12. Fresh air is also delivered to the fan 55 through the tube 54 above mentioned, which tube communicates with the chamber 60 located at the discharge side of the filter 61. The inlet side of the filter is exposed to the inlet chamber 62 which is provided by an enclosure 63 projecting at the rear side of the base, as clearly seen in FIGURES 2, 3, 6 and 7. An air inlet 64 is provided into the chamber 62 and this inlet is adapted to be controlled by a valve member 65 pivotally mounted at 66. This valve is operated by means of a lever 67 which serves a double function, namely as the operating element for the valve 65 and also as a signal device. Thus, when the valve is open the lever 67 lies in a horizontal position shown in dotted lines in FIGURE 7, the valve here being shown in full lines as displaced away from the inlet opening 64. This position of the lever also appears in FIGURE 2. When the air inlet is blocked by the valve member 65, the lever 67 is in the upright position indicated in dot and dash lines in FIGURES 6 and 7. This lever may advantageously be colored red to give a visual signal that the air inlet opening is closed. The lever, as will be apparent from examination of FIGURE 6, will be readily visible even from the front of the incubator because in its upper or valve-closed position the lever extends above the level of the mattress and can readily be seen by an attendant at either side of the incubator. If the attendant is at the front the signal is of course observable through the transparent front and back walls of the hood.

The purpose of the valve and signal arrangement just described is related to another feature of the invention, namely the arrangement of the oxygen supply connection 68 so as to deliver the oxygen into the inlet chamber 62. By introducing the oxygen into the circulation system at this point, the filter 61 is utilized not only to filter the make-up air but also to filter any oxygen which may be used. The oxygen supply may be provided with an oxygen flow limiting device 69 of well-known construction.

In instances where it is desired to utilize oxygen alone for make-up purposes, the valve 65 is shifted to close the air inlet port 64, and at that time the signal 67 will indicate the fact that the incubator is operating upon oxygen alone as make-up gas. Advantageously the filter may be of the type disclosed in Stoner Patent 3,076,451, issued Feb. 5, 1963.

By virtue of the arrangement described above make-up breathing gas (either oxygen or air) is introduced into the system through the filter and into the pipe 54 and the blower fan 55, the introduction of the make-up gas being assisted by virtue of the positioning of the discharge end of the pipe 54 within the passage 53 through which the recirculating air flows to the fan.

Figure 2:
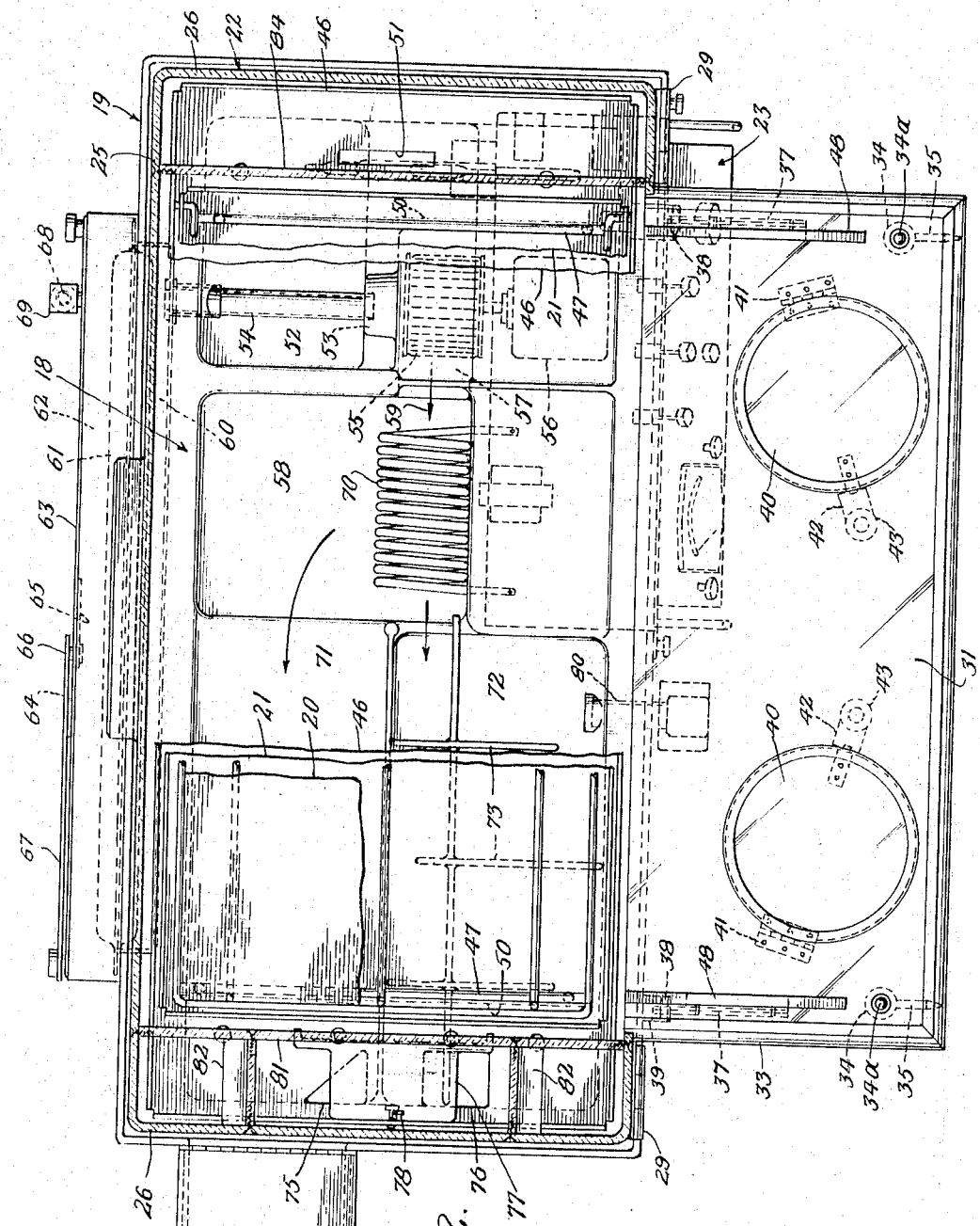
FIGURE 2 is a plan section taken substantially as indicated by the line 2—2 on FIGURE 1, with certain parts broken away to show others lying beneath, this view also showing a side access door in open position instead of the closed position of FIGURE 1.

In chamber 58 the air (or air and oxygen) is adapted to be warmed by means of the heater element indicated at 70 in FIGURE 2. And from this chamber 58 the warmed air then passes through one or both of two parallel chambers 71 and 72, arranged in the general manner fully disclosed in the issued patent above identified. In contrast to said prior patent, however, the chamber 72 which is provided for the purpose of humidification of the air flowing therethrough is equipped with a series of baffles 73 providing a tortuous path in a horizontal plane the arrangement of these baffles and the flow path being clearly evident from FIGURE 12. Cooling of the air flowing through chamber 71 is effected by means of an ice bath provided in a chamber 74 located below the chamber 71, in the manner disclosed in said prior patent. The details of this arrangement need not be considered herein but reference may be had to the above-mentioned patent for further information.

All of the chambers 52, 58, 71 and 72 of the base 18 are provided with partitions extended to the upper surface of the base and adapted to cooperate with the underside of the deck 46 in order to close the various chambers and prevent short circuiting of the air flow in an unintended path. Air is discharged from chambers 71 and 72 upwardly into the hood of the incubator through discharge ports 75 and 76 which are provided in the deck 46 respectively overlying the discharge ends of the chambers 71 and 72 (see FIGURES 2, 4, 8 and 12). Slidably arranged above the deck in position to regulate the flow through ports 75 and 76 is a rectangular valve member 77 adapted to be shifted across the ports 75 and 76 by means of a lever 78 the upper end of which is pivoted as at 79 in one of the end walls 26 of the incubator. A knob or handle working through the pivot 79 may be employed for adjustment of this valve from the exterior of the incubator (see FIGURES 2, 3 and 4).

Attention is now called to the fact that the port 75 which is provided for the cooled air flowing from chamber 71 is triangular in shape and positioned so that upon closure thereof by the valve member 77 the area of the port decreases as a non-linear function of valve motion, the area being shut off progressively more quickly with such motion of the valve. On the other hand the port 76 provided for the flow of the humidified air is rectangular, thereby providing for closing off of the area of the port as a linear function of valve motion. These arrangements are provided having in mind the presence of the baffles 73 in the humidification chamber. Since the baffles tend to restrict the flow of air through the humidification chamber as compared with the flow through the cooling chamber, the employment of the triangular and rectangular flow passages as just referred to results in substantial uniformity of overall flow with different positions of adjustment of the valve 77. The shifting movement of the valve may be employed to completely close off either one of the ports 75 and 76, or the valve may be adjusted to provide substantially any desired proportions of humidified and cooled air entering the hood of the incubator. It will be understood that provision is made for introducing water into the humidification chamber, for which purpose a water inlet 80 is provided (see FIGURES 1 and 2).

In order to reduce cleaning and sterilization problems, the chambers in the base are all advantageously made of smooth corner construction, as in an aluminum casting. The baffles 73 are desirably interconnected and arranged for easy removal and replacement as a unit in the manner of a grid in an ice cube tray.

The motor, fan and heater are also readily removable from the base casting, for instance in the general manner disclosed in the patent above identified.

In order to provide for desirable distribution of air within the hood of the incubator and to reduce concentrated air currents or eddies in the region of the infant occupying the incubator, certain special baffling arrangements are incorporated in the hood. Thus, at the inlet end (see FIGURES 2, 4 and 6) a baffle 81 lying in a vertical plane is provided between the adjacent end of the mattress support and the end wall 26 of the hood. This serves to direct the air entering through the ports 75 and 76 upwardly past the infant resting upon the mattress. Additional baffles 82—82 are provided within the hood in an inclined position to direct the flow entering through the port 75 and 76 inwardly toward the central region of the adjacent end of the hood.

At the opposite end of the hood, i.e., the end from which the air is withdrawn from the hood through the opening 51 in the deck 46, a horizontal baffle 83 is arranged projecting inwardly from the adjacent end wall 26 of the hood and overlying the outlet 51. Another vertical baffle 84 is positioned vertically between the opening 51 and the adjacent end of the mattress support, this baffle wall being of substantially the same height as the wall at the inlet end and serves to shield the adjacent end of the mattress support from direct air current flow into the outlet.

Attention is now called to the fact that on the hood (see FIGURES 1 and 6) toward the right hand end of the inclined panel 28, there is a thermometer 85 located with its bulb in the zone above the horizontal baffle 83 at the discharge end of the hood. It has been found that this relative arrangement of a thermometer and the baffle 83 provides for accuracy of thermometer reading which is not obtainable with most locations of the thermometer within the hood. This baffle 83 is also a protection against accidentally breaking the thermometer bulb.

Attention is now further called to the fact that the deck 46 constitutes the top wall of various of the air chambers in the base. For the purpose of maintaining snug fit of the deck with respect to the base and thus avoiding undesirable short circuiting of air flow, the base is provided with posts 86 which are desirably rubber capped, two such posts being provided toward each end of the incubator and being lined up with the lower edges of the vertical baffles 81 and 84 in the hood. When the hood is lowered to the closed position, the lower edges of the baffles 81 and 84 engage the posts 86 and thus snugly hold the deck in place on the top of the base. This provides for accuracy of fit of the deck on the base without requiring any screw fittings or other devices which are inconvient to disconnect and which also would represent locations where impurities might accumulate thereby rendering cleaning and sterilization more difficult.

Turing now to another aspect of the invention, attention is called to the fact that as shown in FIGURE 8 and 9, within the mattress supporting tray 21 there is a framework 87 which is pivoted at 88 toward one end of the mattress, so that the other end of the framework 87 may be raised with reference to the tray 21 and also with reference to the deck 46. This provides for inclining the mattress and thus the infant as desired. For the purpose of controlling the inclination a pneumatic cell 89 may be disposed between the framework 87 and the tray 21, air being admitted to or discharged from the cell through a flexible connection 90 cooperating with a bulb 91 which may be employed to blow up the cell 89 and which may be equipped with a valve 92 for discharge of air from the cell. In this way the inclination of the mattress may be varied and maintained at any value desired. The bulb 91 may be located outside of the incubator, thereby providing for change in inclination of the mattress without requiring opening of any port or door.

As an alternative for controlling the inclination of the framework 87, the arrangement shown in FIGURES 10 and 11 may be employed in which the cell 89 is dispensed with and a pair of standards 93 are provided at one end of the framework so that the tray parts 94 may alternatively be positioned at various different heights on the standards 93. Longitudinal shifting movement of the framework 87 to enable adjustment may be provided by the use of slotted openings 95 for the pivot mounting parts 88, as will be clear from FIGURE 10.

Figure 17:
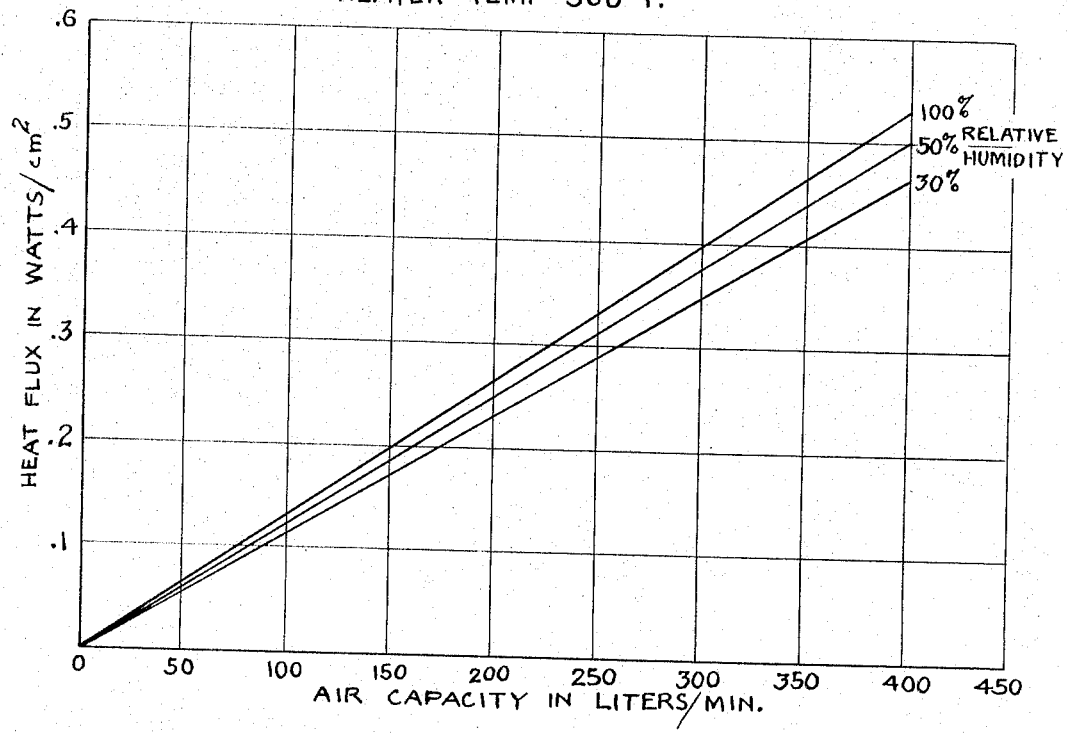

As hereinabove indicated, it is contemplated according to the invention to operate the heater 70 in such manner as to maintain the surface temperature thereof below about 300° F. in order to prevent any possible conversion of ether to formaldehyde in the air circulation system. For this purpose it is desirable to observe the values referred to in the graph of FIGURE 17. Specifically, the capacity of the air circulation means and the heat flux of the heater are so selected that in the air temperature range of from 90° to 100° F. the heater temperature will not exceed 300° F. The values for heat flux and air capacity will vary somewhat depending upon the relative humidity of the air in the incubator, as is apparent from the three lines of the graph of FIGURE 17 which represent respectively the values to be observed for 30% relative humidity, 50% relative humidity and 100% relative humidity.

Figure 15:
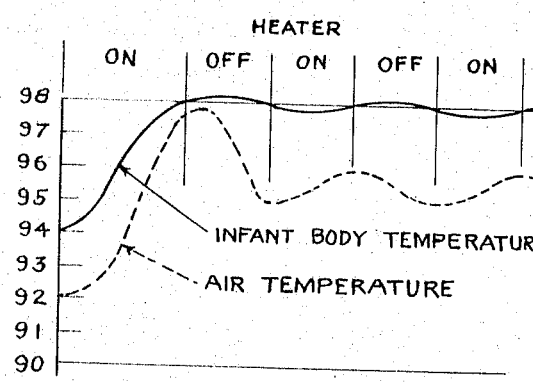
FIGURE 15 is a graph of air and infant temperatures typically occurring when the incubator is employed in the automatic type of operation represented by the diagram of FIGURE 13.

The incubator of the present invention is adapted to be operated in either of two modes of operation represented by the diagrams of FIGURES 13 and 14. In FIGURE 13, a thermostat or probe 96 is directly associated with the infant in the incubator and connected with the circuit for the heater 70, thereby providing for turning the heater on and off according to the body temperature of the infant. A graph representing typical operating conditions when the incubator is employed in this manner is sown in FIGURE 15, the figures at the left hand side of the graph representing temperature values in degrees Fahrenheit. Here the cycling of the operation of the incubator consequent upon fluctuation of the infant's temperature slightly above and below 98° F. will be apparent, as also will the effect of this fluctuation in temperature upon the air temperature in the incubator.

Figure 16:
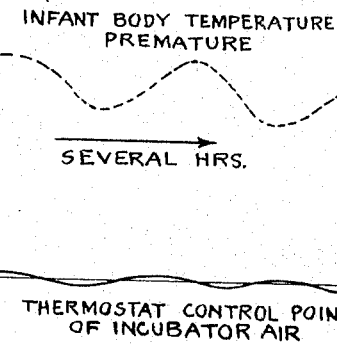
FIGURE 16 is another graph illustrating typical operation of the incubator in accordance with the alternative mode of operation represented by FIGURES 14.

In the alternative mode of operation, represented by FIGURE 14, it is contemplated that the temperature of the incubator may be regulated by a thermostat 97 located in the air flow passage through which the air is withdrawn from the hood. In this mode of operation, this air thermostat directly controls the current to the heater element 70. The infant body temperature and thermostat control point temperature in a typical operation of this kind are indicated in the graph of FIGURE 16. Here it will be seen that there is not a direct correlation between the air temperature and the infant's temperature and also that the infant's temperature may have a tendency to vary to a somewhat greater extent than in the mode of operation where the infant's body temperature itself is the controlling factor, as in FIGURES 13 and 15.

From the foregoing it will be seen that the incubator of the present invention contemplates a number of features rendering the operation of the incubator effective and reliable, as well as foolproof and convenient all of which are vital factors in equipment of this sort.

We claim:

1. An incubator comprising a base having an infant support, and a rectangular box-like hood surmounting the base and adapted to enclose an infant resting on the support, the hood having a generally vertical side wall and a transparent substantially flat wall panel along the top edge of the side wall thereof extended from said side wall in a direction over the infant support, said side wall having portage therethrough for manual access by an attendant to an infant on the support below the transparent wall panel, and the transparent wall panel being extended from said side wall at an upwardly inclined angle to provide to an attendant clarity of observation of manual attention given by the attendant to the infant through the manual access portage, means in the base for establishing air flow through the hood in a direction generally lengthwise of the transparent inclined wall panel, a thermometer having a bulb mounted within the hood in a position adjacent an end of the transparent inclined wall panel, and an air flow baffle in the hood projecting inwardly from the side wall of the hood between the base and the thermometer.

2. An incubator comprising a base having an infant support, and a rectangular box-like hood surmounting the base and adapted to enclose an infant resting on the support, the hood having a generally vertical side wall with portage therethrough for manual access by an attendant to the infant on the support, the access portage comprising an elongated door having its lower edge adjacent the lower edge of the side wall of the hood, the incubator further including hinge means providing coincident pivot axes for mounting the door for downward opening movement and for mounting the hood for upward opening movement.

3. An incubator comprising a base having an infant support of greater length than width, a box-like hood surmounting the base and having an oblong plan form adapted to enclose the infant support with an infant resting thereon, air circulation means in the base below the infant support and having means of communication with the hood, an elongated access door in one of the long sides of the hood, the door being pivotally mounted on an axis below the level of the infant support and providing for outward and downward pivotal opening movement of the door, and means limiting the outward and downward movement of the door to a position in which the door is substantially horizontal, the infant support being mounted for movement sidewards from an inner position over the base to an outer position at least in part over the door when the door is open.

4. An incubator according to claim 3 and further including tracks for mounting the infant support, such tracks being provided on the base and also on the door and providing for support of the infant support during sideward movement thereof between its inner and outer positions.

5. An incubator according to claim 3 and further having an arm port providing for manual access to the infant through at least one of the long sides of the hood.

6. An incubator according to claim 3 and further having an arm port through the door with an openable closure means.

7. An incubator comprising a base member having upwardly open air chambers therein, a deck overlying the base member and adapted to close the upper side of the air chambers, a mattress support overlying a central portion of the deck and leaving portions of the deck extended beyond the mattress support at opposite sides thereof, a hood surmounting the base and providing an atmosphere enclosure for an occupant of the incubator, air passage through the portions of the deck extended beyond the mattress support to interconnect air chambers in the base member and the interior of the hood and provide for air circulation through the hood, generally upright baffle members in the hood positioned between the mattress support and said air passages, yielding sealing means between the base and the edge of the hood, and deck hold-down means acting between the lower edges of the hood baffle members and regions of the deck between the mattress support and the air passages through the deck.

8. An incubator comprising a base, a horizontal deck overlying the base, a hood surmounting the base and enclosing the space above the deck, a mattress support mounted on the deck, and means for varying the mounting angle of the mattress support comprising a pivotal mounting for the mattress support, a pneumatic cell below the mattress support, and a fluid pressure control line for the cell extended to a point exterior of the hood, to provide for variation of the angle of the mattress support without opening the hood.

9. An incubator comprising a base member with an air chamber therein, an infant support above the base, a hood surmounting the base and adapted to enclose the support with an infant thereon, and breathing gas inlet means associated with the air chambers in the base and including a filter, an inlet chamber at the inlet side of the filter, an air inlet into the inlet chamber and an oxygen inlet into the inlet chamber, to provide for filtering air and oxygen introduced into the incubator, and circulation means for delivering filtered breathing gas from the air chamber in the base into the hood.

10. An incubator according to claim 9 and further including means for regulating the relative air and oxygen inputs comprising a control valve for the air inlet to the filter inlet chamber.

11. An incubator according to claim 9 and further including a control valve for opening and closing the air inlet to the filter inlet chamber, and a signal device connected with the control valve and arranged to establish a warning signal when the air inlet valve is closed.

12. An incubator comprising a base member with air chambers therein, an infant support above the base, a hood surmounting the base and adapted to enclose the support with an infant therein, the air chambers in the base including a chamber for a blower and a pair of chambers receiving air from the blower in parallel flow, one having an humidifying means therein including baffles providing a tortuous passage therethrough and the other chamber of the pair having means associated therewith adapted to effect cooling of the air passing therethrough, the pair of parallel chambers having separate outlets communicating with the interior of the hood, the outlet for the humidifying chamber being rectangular and the outlet for the cooling chamber being triangular and being arranged with the base of the triangle presented toward the rectangular outlet, and common valve means overlying the outlets and being shiftable in a direction to vary the proportion of opening of each outlet.

13. An incubator comprising a base with air chambers therein including an air warming chamber, an infant support above the base, a hood surmounting the base and adapted to enclose the support with an infant thereon, means providing for circulation of air from the hood through the warming chamber and again into the hood, and a heater in the warming chamber, the capacity of the circulation means and the heat flux of the heater being such as to maintain a heater surface temperature below 300° F.

14. An incubator comprising a base having an infant support, and a box-like hood surmounting the base and adapted to enclose an infant resting on the support, the hood having an arm port through a side wall, a door for closing the port, and a hinge for the door having a hinge axis providing for lateral swinging movement from closed to open position, a releasable door latch having an operating push button operable by the elbow to release the latch, and spring means acting on the door to urge the door toward open position.

15. An incubator comprising a base having an infant support, and a box-like hood surmounting the base and adapted to enclose an infant resting on the support, the hood having an arm port through a side wall, a door for closing the port, a hinge for the door having a hinge axis angled to the vertical to provide for gravity opening movement of the door, a releasable door latch having an operating push button operable by the elbow to release the latch, and spring means acting on the door to initiate the opening movement of the door upon actuation of the latch.

16. An incubator comprising a base having an infant support, and a box-like hood surmounting the base and adapted to enclose an infant resting on the support, the hood having an arm port providing access to an infant therein, a port closure door pivoted for lateral swinging movement between closed and open positions and biased toward open position, and manual means for opening the door including an operating element positioned for access and actuable by an elbow of an attendant.

References Cited

UNITED STATES PATENTS

| | | | |
|---|---|---|---|
| 1,782,523 | 11/1930 | Warren | 312—311 |
| 2,600,240 | 6/1952 | Grieb | 128—1 |
| 2,624,333 | 1/1953 | Dixon et al. | 128—1 |
| 2,633,842 | 4/1953 | Higgs | 128—1 |
| 2,641,248 | 6/1953 | Armstrong | 128—1 |
| 2,686,922 | 8/1954 | LaVigne | 128—1 |
| 3,000,376 | 9/1961 | Smith et al. | 128—1 |
| 3,076,451 | 2/1963 | Stoner | 128—1 |
| 3,084,492 | 4/1963 | Dorsak et al. | 55—265 |
| 3,158,150 | 11/1964 | Croadsdaile | 128—1 |
| 3,187,744 | 6/1965 | Dorsak et al. | 128—1 |

RICHARD A. GAUDET, *Primary Examiner.*

SIMON BRODER, *Examiner.*

Disclaimer 3,335,713.—*James R. Grosholz*, Strafford, and *John D. Wallace*, Wyndmoor, Pa. INFANT INCUBATOR. Patent dated Aug. 15, 1967. Disclaimer filed Dec. 30, 1968, by the assignee, *Air-Shields, Inc.*

Hereby enters this disclaimer to claim 9 of said patent.

[*Official Gazette April 29, 1969.*]